FIG_4

FIG_7a

FIG_7b

INVENTOR.
JOSEPH T. MCNANEY
BY
ATTORNEY.

FIG_5d

FIG_5a

FIG_5b

| LIGHT SOURCE | | VERT DISPLAY TUBE | | MESSAGE CHARACTERS |
|---|---|---|---|---|
| VERT | HORIZ | VERT | HORIZ | |
| 0 0 | 0 0 | 0 0 | 0 0 | Ref |
| 0 0 | 0 1 | 0 0 | | 2 |
| 0 0 | 0 1 | 0 1 | | T |
| 0 0 | 0 1 | 1 0 | | G |
| 0 0 | 0 1 | 1 1 | | V |
| 0 0 | 1 0 | 0 0 | | M |
| 0 0 | 1 0 | 0 1 | | X |
| 0 0 | 1 0 | 1 0 | | O |
| 0 0 | 1 0 | 1 1 | | Z |
| 0 1 | 0 0 | 0 0 | | A |
| 0 1 | 0 0 | 0 1 | | L |
| 0 1 | 0 0 | 1 0 | | C |
| 0 1 | 0 0 | 1 1 | | 4 |
| 0 1 | 1 1 | 0 0 | | D |
| 0 1 | 1 1 | 0 1 | | 3 |
| 0 1 | 1 1 | 1 0 | | S |
| 0 1 | 1 1 | 1 1 | | H |
| 1 0 | 0 0 | 0 0 | | I |
| 1 0 | 0 0 | 0 1 | | P |
| 1 0 | 0 0 | 1 0 | | 9 |
| 1 0 | 0 0 | 1 1 | | R |
| 1 0 | 1 1 | 0 0 | | 6 |
| 1 0 | 1 1 | 0 1 | | F |
| 1 0 | 1 1 | 1 0 | | W |
| 1 0 | 1 1 | 1 1 | | 7 |
| 1 1 | 0 1 | 0 0 | | Y |
| 1 1 | 0 1 | 0 1 | | B |
| 1 1 | 0 1 | 1 0 | | 8 |
| 1 1 | 0 1 | 1 1 | | J |
| 1 1 | 1 0 | 0 0 | | N |
| 1 1 | 1 0 | 0 1 | | 5 |
| 1 1 | 1 0 | 1 0 | | E |
| 1 1 | 1 0 | 1 1 | | U |
| 1 | 2 | 3 | 4 | |

CODE CHART

FIG_5c

FIG_9a

FIG_6b

FIG_9b

FIG_6a

FIG_11

FIG_10a

FIG_10b

FIG_10c

INVENTOR.
JOSEPH T. MCNANEY
BY
ATTORNEY.

3,087,087
ELECTRON BEAM CONTROL APPARATUS FOR
LIGHT RESPONSIVE DISPLAY TUBES
Joseph T. McNaney, La Mesa, Calif., assignor to General
Dynamics Corporation, Rochester, N.Y., a corporation
of Delaware
Filed Feb. 28, 1956, Ser. No. 568,236
6 Claims. (Cl. 315—8.5)

This invention relates generally to an apparatus for producing a "stored" display within an evacuated container. More particularly, the invention relates to a means for controlling or regulating passage of the electron beam that provides the display.

This invention is an advancement over such prior art cases as my Patent No. 2,283,383 wherein, the primary beam of electrons in a cathode ray tube is used to excite electron emissive material thereby producing a secondary stream of electrons which stream is then accelerated through a shaping device to form a character for display upon the target. In another type of related approach exemplified by my Patent No. 2,730,708 the primary electron beam is employed to actuate localized areas of electron emissive material and in accordance with light modulation of the electron emissive material there is produced a secondary stream of electrons which, when accelerated, impinge upon the target in the form of the desired light modulation. In both of these cases, it has been true that the primary beam of electrons became decelerated upon excitation of certain localized areas and a secondary beam of electrons was formed which required reacceleration.

The present invention contemplates the control of a beam of electrons in response to selective excitation of a control means, or a control grid. The control means selectively controls, regulates or modulates the beam and permits it to pass through the control means or grid in response to such excitation of the grid thereby producing the desired intelligence by impingement of the beam upon the target of the container. This particular system lends itself readily to the placement of the light control or modulation source either without or within the container. Therefore, when it is desired to display characters upon the face of a cathode ray display tube, the mask for determining the light modulation, namely the characters, may be placed on the outside of the tube such as is shown in my Patent No. 2,730,708, and the image thereof projected by means of lenses onto the control means. The control means in turn will modulate the primary electron beam in a manner corresponding to that light modulation. The present invention, however, also teaches the utilization of a cathode ray light source and lens system in combination with a mask of message characters that may be selected for illumination in response to a system of predetermined message codes.

Another embodiment of this invention makes use of the cathode ray tube light source, lens system and mask to control the emissivity of a photocathode for the generation of character shaped beams for message display purposes.

Another embodiment of this same invention permits the inclusion within the evacuated container of a low velocity electron beam source and, by means of overlaying the light responsive control means with an electron beam to light transforming material, permit the low velocity beam to be modulated in response to a controlling action of a high velocity electron beam. The effect of the high velocity beam on the electron beam to light tranforming material will permit the low velocity beam to be modulated in response to a controlling action of a high velocity electron beam. The low velocity electron beam will pass therethrough in a manner determined by the light modulation of the control means.

It is therefore an object of this invention to provide a new and improved means to control an electron beam.

It is another object of this invention to provide a new and improved means for controlling regulating or modulating an electron beam in response to an independent excitation of the means.

It is another object of my invention to provide a new and improved means permitting substantially instantaneous conversion of modulated light patterns into sustained light rays.

It is another object of my invention to provide an apparatus which responds to instantaneous input control signals to retain information on the target or screen of a cathode ray tube.

It is another object of my invention to provide control of the persistence and light output levels of cathode ray tube screens.

It is another object of my invention to provide an apparatus capable of converting visual displays into either negative or positive images as may be desired.

It is another object of my invention to permit the formation of formats of characters from a matrix by means of light rays external to the cathode ray tube and modulating the electron beam in conformity therewith.

It is another object of my invention to provide displays of information and symbols having a higher degree of resolution on the target or screen wherein the symbols lack normal support bridges used in formats such as exemplified by my U.S. Patent No. 2,735,956.

It is another object of my invention to permit interchanging of character styles and types independent of the particular tube and use.

It is another object of my invention to arrange the message characters and symbols in the light modulating mask so that their respective positions will have a direct relationship to the message codes transmitted or coupled to the control system.

It is another object of my invention to provide a new and improved cathode ray tube wherein an electron beam may be selectively modulated in accordance with externally positioned light modulation.

Objects and advantages other than those set forth will be apparent from the following description when read in connection with the accompanying drawings, in which:

FIGURES 1a and 1b are views in cross section of a complete evacuated container and an enlarged portion of the container, respectively, both embodying the invention;

FIGURES 2a and b are views in elevation of the control means;

FIGURE 6a shows an illustrative circuitry for use with the embodiment of FIGURE 4;

FIGURE 6b is a typical secondary emission curve;

FIGURES 9a and b are enlarged views of the control means of FIGURE 8;

FIGURE 11 is a curve showing low velocity beam current as a function of photoconductor potential with respect to time.

Figures 1A, 1B, 2A, 2B:
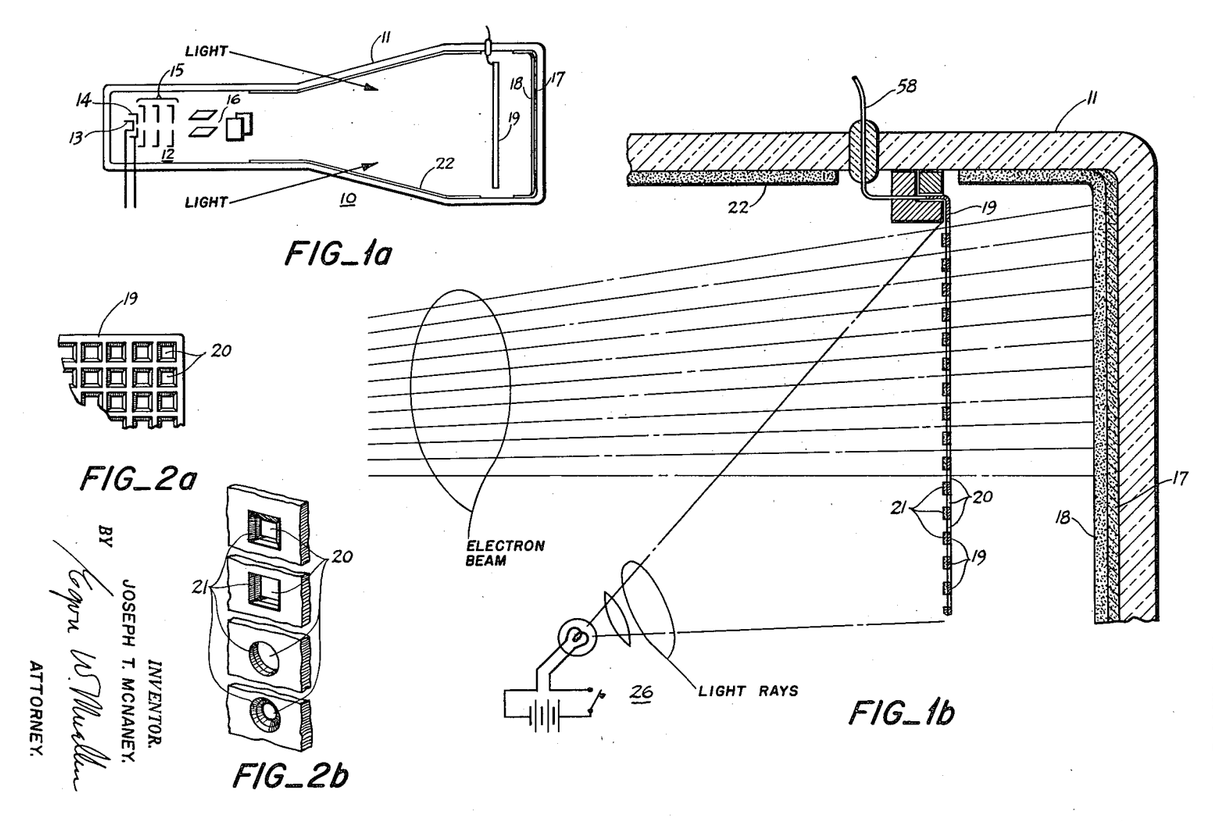

Shown in FIGURE 1a is an evacuated container 10 wherein at least a portion of the exterior envelope 11 may be of any desired transparent or opaque material such as glass, plastic or the like. The envelope 11 may be of any desired shape, although it is shown in the preferred embodiment in the shape of a normal cathode ray tube.

Positioned in one part of the container or envelope 11, for example, at one end thereof, is an electron beam generating means or electron source 12. The electron source comprises essentially a cathode 13, a control grid 14, a plurality of accelerating electrodes 15 and deflection plates 16. In another part of the container 10, for example, at the other end thereof, and within the envelope 11, is positioned an electron responsive electron beam to light converter or target means such as a fluorescent screen 17. It should be understood that the invention includes any known form of target capable of responding to the electron beam excitation either for conversion into light or for direct utilization of the stream of electrons. My preferred embodiment utilizes the fluorescent screen to convert the electron excitation into light. There may be disposed upon the screen on the side facing the electron source an electron transparent metal coating 18, such as aluminum. The screen metallized in this manner may aid the electron accelerating system and will also aid in additional reflectiveness thereby increasing the light output of the screen.

Disposed intermediate the target area and the electron source is a storage means for selectively regulating or controlling electrons during their passage from the source to the target. This means may be a control, electrode or grid 19 which is light responsive. The control electrode, shown in somewhat more detail in FIGURE 1b, is utilized to control part, or all, of the primary electron beam from the electron source 12 and to impose thereon any desired light modulation recorded on the surface of the electrode 19. The electrode 19 shown in detail in FIGURES 2a and b, is perforated with a plurality of perforations 20 for passage of the electron beam therethrough. The control means 19 is positioned within the container 10 substantially parallel to the target area and perpendicularly disposed with respect to the longitudinal axis of the container.

The control grid 19 comprises essentially a mesh of electrically conductive material. Disposed generally adjacent the perforations 20 on the side of the mesh facing the electron source is a light responsive photosensitive material 21, of any known type, such as, selenium, cadmium sulfide, silver selenide and the like. The present invention utilizes preferably a selenium photo-sensitive material disposed adjacent the perforations. The perforations 20 may be made of various sizes and shapes, for example as shown in FIGURE 2b they may be trapezoidal, rectangular, cylindrical, conical or any other known shape or configuration. The light responsive material 21 follows the well known manner of operation of photoconductors, namely, the material becomes conductive when exposed to light rays, and is electrically resistive or non-conductive in the absence of light rays.

Basically, in operation, the photoconductor establishes charge patterns or states of equilibrium potentials on an insulating surface under electron bombardment. Under steady bombardment by primary electrons in a high vacuum, an insulated element of the light responsive material 21 which is at an arbitrary initial potential with respect to the surrounding materials such as a collector 22, and the metallic backing 19, will be charged to an equilibrium potential. For any given material then, the value of equilibrium potential depends on the energy of the primary electrons, namely, the electron beam striking the light responsive surface 21, and the effective resistance of the material between its surface and the metallic backing 19.

Figures 6A, 6B, 9A, 9B, 11:
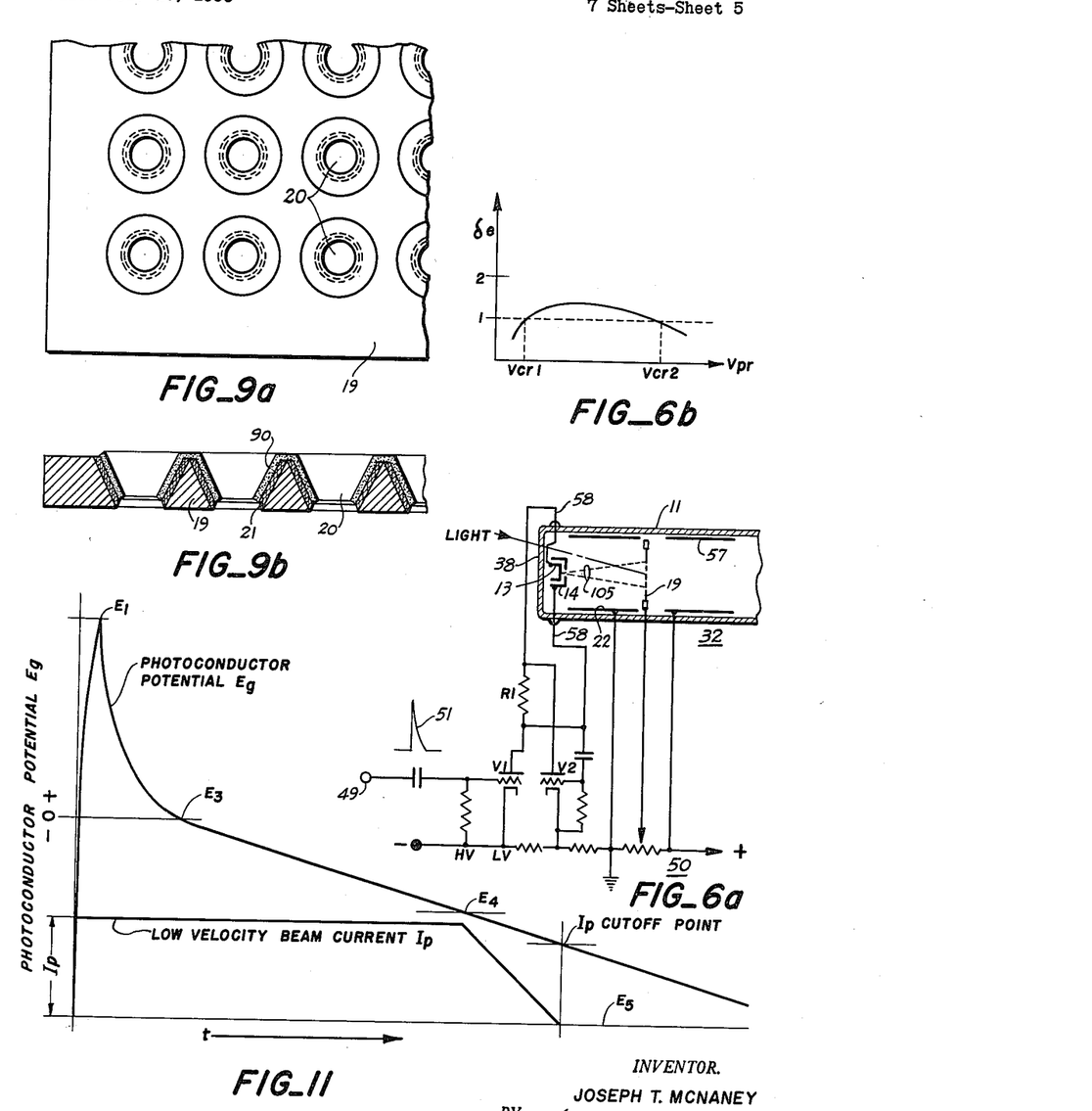

FIGURE 6b is a typical secondary emission curve of materials showing a secondary-emission ratio $\delta_e$ as a function of primary electron energy $V_{pr}$, expressed in electron volts. $\delta_e$ is defined as the ratio of the secondary current $i_s$ to the primary current $i_{pr}$. The lower and higher values of $V_{pr}$ corresponding to $\delta_e = 1$ are designated as first and second cross-over potentials $V_{cr1}$ and $V_{cr2}$, respectively. $V_{cr1}$ is usually of the order of 100 volts, or less, and $V_{cr2}$ of the order of 1000 volts or greater. This curve always exhibits a maximum value of $\delta_e$ between $V_{cr1}$ and $V_{cr2}$. At primary energies below the maximum $\delta_e$ increases with increasing $V_{pr}$ because of the increasing primary energy available. At primary energies above the maximum, $\delta_e$ decreases as a function of $V_{pr}$ because the secondary electrons are generated in progressively deeper layers of the surface material and therefore are absorbed to a greater degree with increasing $V_{pr}$. If a potential difference has been established between the light responsive material 21 and the conductive backplate 19, the incident light at a particular element will reduce this potential difference by increasing the conductivity of the light responsive material.

The initial potential difference may be established, for example, if the light responsive material 21 is bombarded with primary electrons from the electron source 12. The source potential is greater than $V_{cr2}$ so that the material is charged negatively with respect to the collector 22 potential. At the same time the conductive backing 19 is maintained at a positive potential with respect to the collector resulting in a corresponding potential difference between the material 21 and the conductive backing 19.

The establishment of this negative potential on the light responsive material 21 will regulate, control or stop the flow of electrons from passing through the perforations of conductive backing until the charge has been discharged from the material to the conductive backplate upon illumination by light which may, for example, be derived from an external light source 26. It should also be apparent that the degree of illumination will determine of regulating, controlling or modulating of the electron beam through the perforations.

Figure 4:
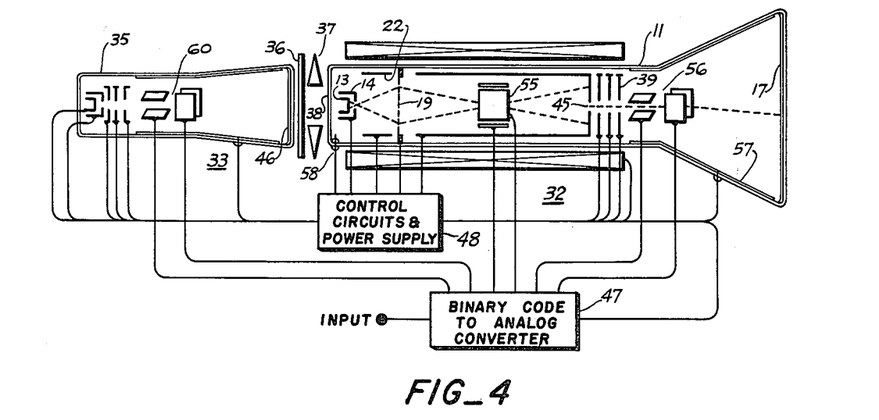
FIGURE 4 shows a further embodiment of the invention wherein the external light modulation is derived from an electron tube, the modulation being in accordance with a pattern projected onto the electron control element of a message display tube.

Therefore, regardless of the position of the control electrode or grid 19, its relative proximity to the screen 18 as shown in FIGURE 1, or to the cathode 13 as shown in FIGURE 4, the basic operating concept will be the same.

Figure 3:
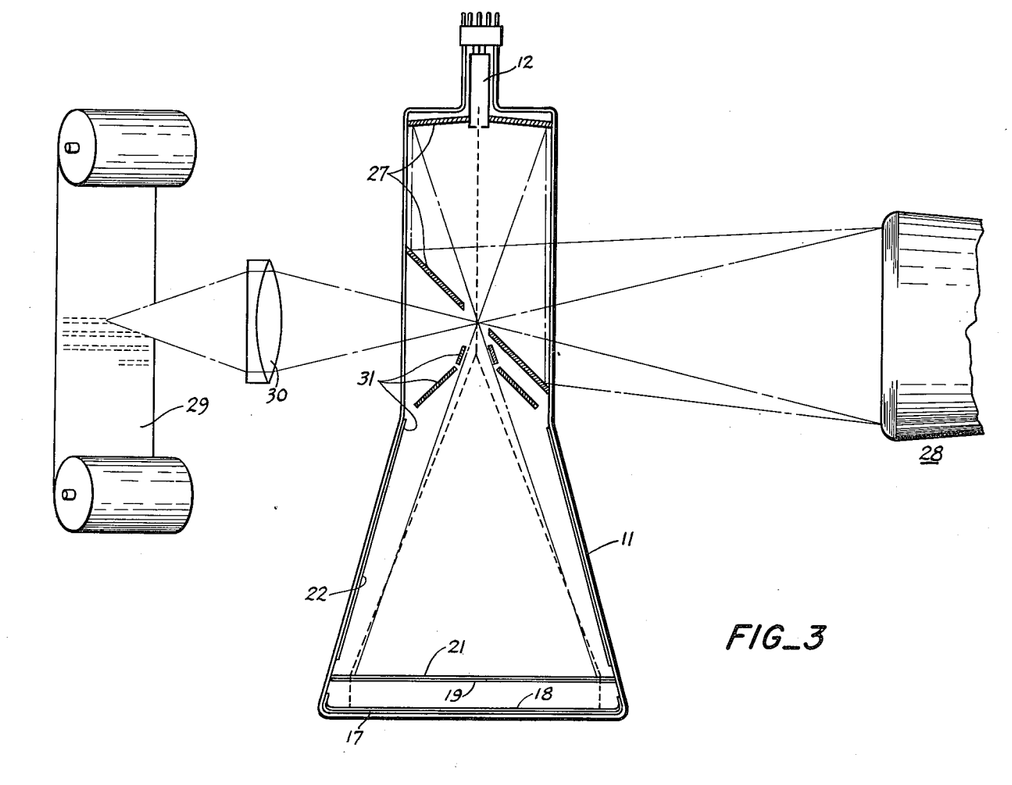
FIGURE 3 is an additional embodiment of the invention showing the utilization of externally positioned information sources optically directing the same to the control means to modulate the electron beam.

FIGURE 3 shows utilization of the control grid 19 at the screen end of the tube, and by use of reflecting mirrors 27 it is shown how the particular light image may be taken from a cathode ray tube 28, or other sources of light, to effect the necessary charge potentials on the grid 19 which in turn modulates the election beam from gun source 12 corresponding therewith. FIGURE 3 also shows how the light image from the cathode ray tube 28 may be, simultaneously, projected on a photosensitive record medium 29 through a lens 30. Various other well known optical systems may be used in order to take light images from a particular source and mirror them onto the grid 19. An electron lens 31 is utilized to cause a flooding of the grid 19 by electrons from the gun source 12.

An embodiment showing the control grid 19 positioned in the neck portion of display tube or electron emitting beam tube 32 is shown in FIGURE 4. This embodiment derives its light from a signal controlled source of character illuminations, namely light source means 33 comprising a cathode ray tube 35, mask 36, and lens system 37. In order to gain the inertialess speed which is required in modern-day computer readout devices, a first cathode ray tube 35 is utilized to illuminate a desired character in a character mask or matrix 36, as shown in more detail in FIGURE 5a by application thereto of predetermined control signals. The mask 36 may be positioned either externally or internally of this tube 35 and is shown preferably as externally positioned and permits light to pass therethrough to illuminate the characters. By use of a lens system 37, as is well known in optics, the particular image illuminated in the mask 36 is projected onto the control grid 19 through the window 38 of the envelope 11. The light image projected upon the grid again causes it to function to make the control grid regulate or modulate, or both, the electron passage therethrough, corresponding if desired with the light modulated image projected onto the grid. The electron image is then accelerated through a system of electron lenses 39 and caused to impinge upon the screen 17 presenting there an excitation to the fluorescent phosphor thereby converting the electron image into a corresponding and sustained light image.

Figure 5A:
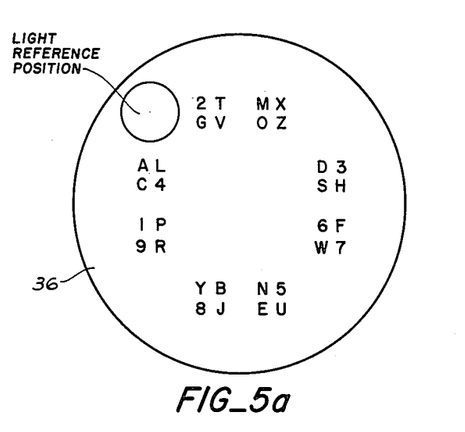
FIGURE 5a is a plan view of a preferred masking arrangement for use in the embodiment of FIGURE 4.

FIGURE 5a indicates a preferred grouping of the characters to be displayed from the mask 36. It is possible by utilizing a beam which will illuminate, for example, 2, T, G, V, as shown in FIGURE 5d, to then arrange a selection means as is shown in my copending application, Serial No. 414,551, which is now U.S. Patent No. 2,761,988, granted September 4, 1956, to select through an aperture 45 one of these images for presentation on a viewing screen 17. Instead of arranging arbitrarily the various groups of characters in the mask 36, they are arranged in a manner that will simplify the conversion of coded signals into displays of their corresponding alphanumeric characters. The mask in FIGURE 5a, for example, shows eight groups of characters, with four characters in each group. The placement of the eight groups, as well as the four characters in each group, has been determined, for example, by a system of predetermined binary codes, similar to those shown in the code chart of FIGURE 5c. The message codes shown in FIGURE 5c are illustrated as comprising six digits each and divided into four sections. Reading from left to right across the columns in FIGURE 5c, the first pair of digits are converted to a vertical deflection voltage for the light source cathode ray tube 35. The second pair of digits are converted to a horizontal deflection voltage for control of the cathode ray tube 35. The fifth and sixth digits, respectively, are converted to vertical and horizontal selection voltages for the display tube 32. The message characters to be identified with the various codes are also shown in this chart.

Figure 5B:
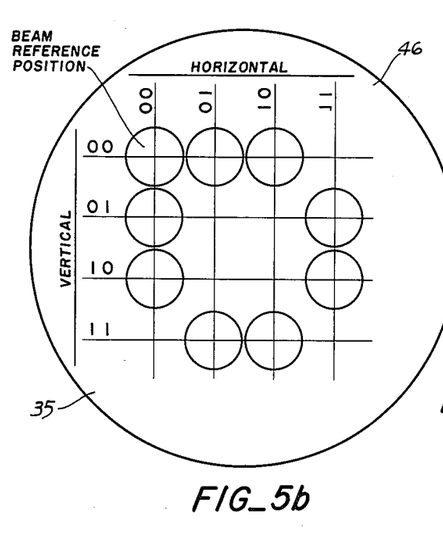
FIGURES 5b and c show the relationship between illustrative message codes and the various positions of an electron beam in illuminating the message characters in the mask.
Figure 5C:
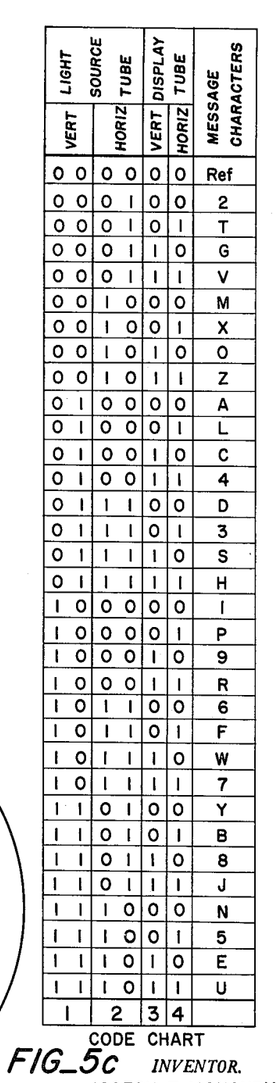
Figure 5D:
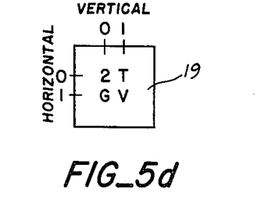
FIGURE 5d shows the relationship between the message codes and a format of characters from which the final selection and presentation of a message character will be made.

The diagram of FIGURE 5b relates the positioning of the beam of the cathode ray tube 35 on the screen 46 of the tube face with the first four digits of the binary code. The beam assumes a reference position on the tube face when the first four digits are zeros. However, between 0000 and 1111, the beam may assume as many as 16 different positions. As shown, however, in the diagram, the illustrative system of beam movement utilizes only eight character illuminating positions. In each of these eight positions of the beam on the screen 46, four characters will be exposed in the mask 36, as shown in FIGURE 5d, and imaged on the surface of the light sensitive material 21 of the control grid 19. The selection of any one of the four characters through the aperture 45 of the display tube gun 32 will be under the control of the fifth and sixth digits of the message codes. The character "2," for example (or the upper left character in any group of four), will be selected in response to digits 00. Digits 01, 10, and 11, will permit the selection, respectively, of characters, T, G, V, from the format shown in FIGURE 5d.

The binary code to analog converter circuits 47 which convert the codes into the required deflection potentials are referred to diagrammatically in FIGURE 4. Other details of the code conversion circuitry may be obtained from my copending application, Serial No. 340,245 which is now U.S. Patent No. 2,850,723, granted September 2, 1958.

FIGURE 6a is a further embodiment of the control circuits 48 shown in FIGURE 4 and explains schematically at least one method by which the charges may be placed on the light sensitive surface of the control grid 19. The areas on the control grid coated with light responsive material which have been positively charged may be erased by the application of a positive pulse 51 to the input terminal 49 of this circuitry. This would allow tube $V_1$ to be conductive, thereby connecting the cathode 13 of the cathode ray tube 32 to a high negative voltage point of the power supply 50 through a load resistor $R_1$. A negative potential pulse developed across $R_1$ is coupled to the control grid of $V_2$, which normally connects the cathode 13 of the cathode ray tube 32 to a low negative voltage point of the power supply, but upon happening of this event is made non-conductive. The potential of the electron beam generated by the cathode 13 with respect to the grid 19 therefore places a negative charge on the photoconductive or light responsive material 21 of the control grid. After the pulsing of $V_1$ and $V_2$ has subsided, the cathode 13 is returned to a low voltage, high current condition which is at, or below, the $V_{cr1}$ operating point of the secondary emission curve shown in FIGURE 6b. The negative charge on the surface of the photoconductor 21 repels all electrons from the low velocity beam and, thereby, regulates or prevents electron flow through the perforations 20. The next step, which includes the exposure of the control grid 19 to the light images, causes the photoconductive material 21 to become conductive over the illuminated areas and thereby, removes the negative charge. Removal of part or all of the negative charge permits the beam of electrons from the cathode 13 to pass through the plurality of perforations 20 in a pattern corresponding substantially to the light images projected thereon.

Reverting again to FIGURE 4, the control grid 19 shown therein may be made of considerably smaller size than that shown in FIGURE 1. The control grid 19 comprises essentially a backing plate which may be made of any well known conductor such as copper and formed with a plurality of perforations 20 therethrough. These perforations may have a cross section of a frusto-conical or conical nature, as exemplified in FIGURE 2b, 9a or 9b. The size of the perforations 20, may, for example, be on the order of 0.0015 inch diameter spaced on 0.003 inch centers. Disposed upon the metallic backing along the outer surfaces of the perforations again is the photoconductive material 21 such as selenium as hereinbefore described for FIGURE 1. The photoconductive material may be deposited on the beveled sides of the perforations thereby presenting a plurality of frustoconical-like sections whose apparent apexes are pointing in the direction away from the source of electrons. The remainder of the cathode ray tube 32 is similar to that aforedescribed in that an electron gun source is positioned in the end of the neck and a plurality of selection plates 55 together with an aperture plate 45, a lens 39 and positioning deflection plates 56 all disposed along the longitudinal axis toward the screen 17. The inner surface of the envelope adjacent the screen area may be coated with a conductive material 57. The screen 17 itself may be an electron sensitive fluorescent phosphor. As is well known in the art, lead-in conductors 58 for the various elements may be disposed in a circular fashion about the neck of the envelope 11.

I have found that in building the control electrode, or grid 19, and in limiting the openings or perforations 20 to .0015 inch diameter on 0.003 inch center, that there may be positioned about 130 x 130 perforations in the 0.4 inch square area. Since a resolving power of $130^2$ is far more than that needed to display the letter "M," for example, or any other character, it may be well to use the 0.4 inch square area as a matrix for as many as four different characters. Allowing four spaces between characters, a resolving power of $60^2$ bits maximum could then be made available for each character. The letter "M," for example, would utilize the maximum area of 60 x 60 bits. I have found that this is more than enough for high quality resolution in display tubes. Center to center spacing of the characters exposed to the control grid may be at least 0.030 inch. This figure added to the character heights of 0.180 inch will establish an overall electron control area of 0.390 inch x 0.3902 inch.

The matrix of characters as shown in FIGURE 5a, which is supported in front of the screen 46 of the cathode ray tube 35, utilizes a prism 37 to project any one group of four characters of the matrix into the control grid 19 in the cathode ray display tube 32. For each group of four characters in the mask 36 there is a prism 37 which focuses that group onto the control grid 19. Therefore, for a matrix of 32 characters, there would be a requirement for 8 prisms. However, it can be seen that the matrix can easily be increased to a possible 64 characters by merely adding another 8 prisms 37 for a total of 16 prisms. It may also be possible if the higher resolving power is not required per character area as hereinbefore described, the group of characters may be increased to 16 for each of the 8 prisms employed. This would increase the total number of characters to 128. It should be obvious from my teachings that a considerable number of combinations are possible in effecting the desired amount of characters for a given application.

The general operation of the embodiment shown in FIGURE 4 will be hereinafter summarized. An electron beam from the gun source of the cathode ray tube 35 is deflected and positioned on the screen 46 by the deflection plates 60 in such a manner as to illuminate one of the groups of characters in the mask 36. The illuminated group of characters will then be optically projected onto the photoconductive surface 21 of the light responsive control grid 19 by prism 37. Just prior to the projection of the image onto the photoconductive surface, the photoconductor 21 is given the negative charge as aforestated, so that it will regulate or control the passage of electrons from the electron beam source 13. Following the illumination of the photoconductor 21, the illuminated areas become electrically conductive therefore allowing the electron repelling negative charge on the grid to be neutralized by the more positive potential connected to the grid 19. This neutralization then permits the passage of electrons through the openings 20 in the illuminated areas of the control grid forming the electron beam into the cross sectional shape of the illuminated area. The desired shaped beam is then selected from among the group of characters comprising the beam in the manner taught in my copending application, namely Serial No. 414,551, where the desired character beam is positioned through an aperture 45 by the selection plates 55. The selected character beam is then accelerated through a lens system 39 and by means of an additional set of deflection plates 56 is directed to any desired position on the viewing screen 17. The electron lens system 39 may also be used to control the imaging and the size of the characters displayed on the screen. When this display tube 32 is used to respond to control signals from an operating circuitry 47 which may be a source of predetermined control signals, such as is taught in my application No. 340,245, the selection of a group of characters from the mask 36 will be synchronized with the selection of a desired character through the aperture 45. In each case, a pair of direct current voltages will be used to operate deflection plates 60 in the light source cathode ray tube 35 and a pair of voltages will be used to operate the selection plates 55 in the display cathode ray tube 32.

Figure 7A:
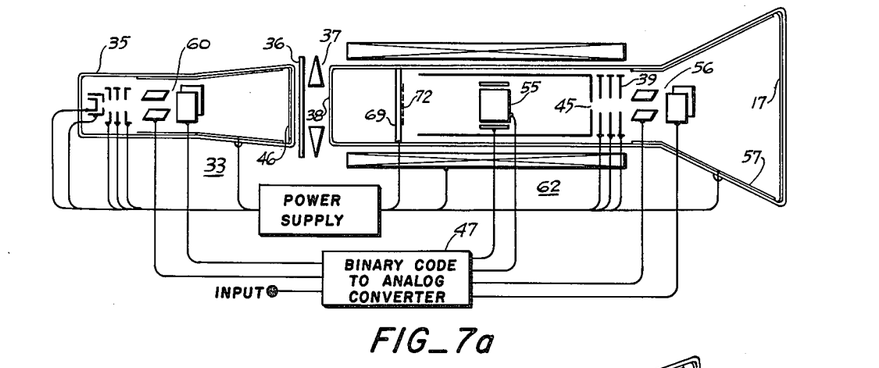
FIGURES 7a and b are still further embodiments of FIGURE 4.

Another embodiment of the invention is shown in FIGURE 7a, which utilizes the combination of the cathode ray tube 35 light source, lens system 37 and mask 36 of FIGURE 4, to control the emissivity of a photocathode 72. The light responsive control grid 19 of FIGURE 4 has been replaced in the display tube or electron emitting beam tube 62 with a photo-sensitive electron emitter 72. This emitter may be of any known electron emitting material either photo emissive or thermionic emissive but is shown here of the caesium-silver oxide type of photocathode which is supported on a light transparent material 69, such as glass. Illuminated character images selected from the mask 36 are formed on the photosensitive surface of the cathode 72 through the window 38 in the envelope 11, of FIGURE 7a. In this embodiment the primary source of electrons originate at the emitting surface of the photocathode 72 and this emission of electrons is under the control of light emanating from the cathode ray tube 35 light source. Character shaped beams in groups of 4, or more, are imaged on the surface of the apertured plate and by means of the selection plate system 55 any one of the beams is directed through the selection aperture 45.

Figure 7B:
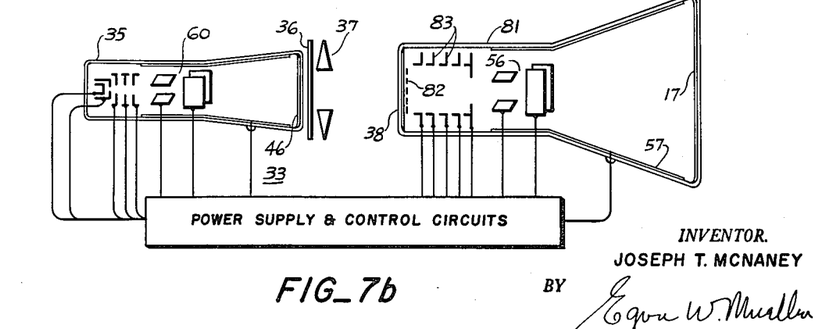

Still another embodiment of this invention is shown in FIGURE 7b, including a cathode ray tube 35 light source, lens system 37 and mask 36 which is designed to project one character at a time on a photocathode 82 supported in the envelope 81 of a cathode ray display tube. Since only one character shaped beam at any given time is permitted to emit from the photocathode 82, a simple electron lens 83 and deflection system 56 may be used to accelerate the beam and position it on the viewing screen 17. The important advantage of the embodiment of FIGURE 7b over that of FIGURE 7d is that a greater area of the photocathode 82 may be utilized in the generation of a character shaped beam, resulting in higher beam current densities. The embodiment comprises, in effect, a cathode ray tube 35 light source for the selection of a series of message characters from a mask 36 in accordance with predetermined message codes, and a second cathode ray tube 81 for positioning and displaying the selected characters on a viewing screen 17, likewise in accordance with predetermined message codes. The size and style of alphanumeric characters or symbols employed, as well as the message codes to be converted, are determined by the placement, and type, of characters in the light mask 36.

Figure 8:
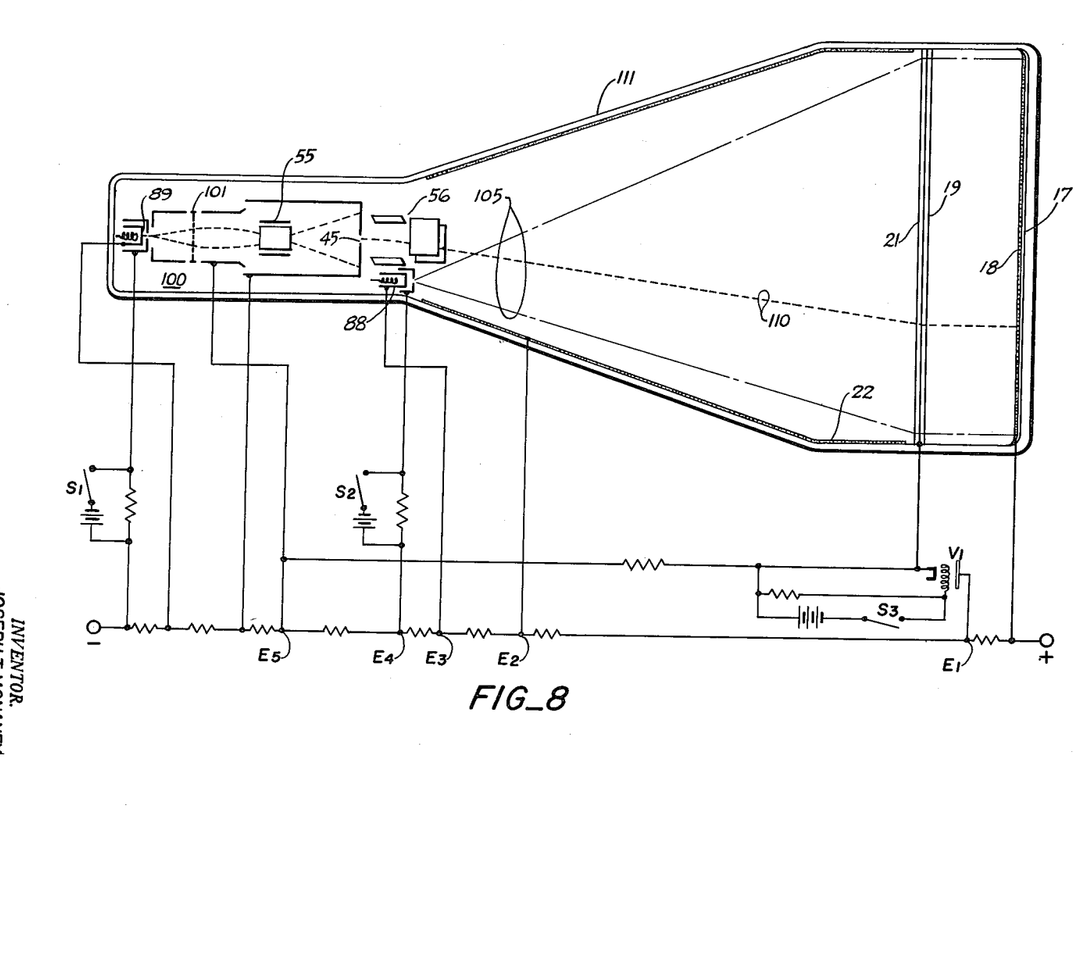
FIGURE 8 shows another embodiment of the invention wherein a low velocity beam is utilized with a high velocity beam to effect operation of the control means.

FIGURES 8 through 12 show an additional embodiment of the instant invention wherein the light responsive material 21 of the control grid 19 is overcoated in the direction of the electron source with fluorescent phosphor material 90. This permits utilization of present invention to store upon the control grid selected information, in the form of electrostatic charge patterns. These charge patterns may be placed on the light responsive material of the control grid by the selective illuminating effects of a high velocity electron beam from a cathode 89 source. A low velocity electron beam from a second cathode 88 source is then used to transfer the information from the control grid 19 to the viewing screen 17 of the cathode ray tube 111. In this embodiment the control grid 19 is placed near the screen 17 of the tube. The grid is shown in detail in FIGURES 9a and 9b. The perforations 20 forming the openings are shown of a frusto-conical shape. The walls of the frustrum portion facing the electron source are coated with photoconductive material 21, such as previously described, and disposed on the photoconductive material 21 is a coating of fluorescent material 90 such as phosphor. This particular embodiment permits the utilization of the control grid 19, by addition of the fluorescent material 90 thereto, to provide means for storing electrical charges and presenting them, when desired, on the viewing screen 17 in the form of light images. This further permits control of the writing rates and the decay rates of the displayed images. FIGURE 8 utilizes essentially a beam forming electron gun 100 including a matrix 101 such as disclosed in my copending application Serial No. 414,551, now U.S. Patent No. 2,761,988. As taught in that application the beam is caused to select a high velocity character shape beam and positions a desired character shaped beam through an aperture 45. The desired character array is then impressed upon the control grid 19 in the manner described and stored thereon until such time as the low velocity electron gun is energized. Energizing of the low velocity gun floods the control grid 19 with low velocity electrons and effects shadowing of the charge patterns formed on the control grid for presentation on the viewing screen 17 of the tube 111.

Figure 10A:
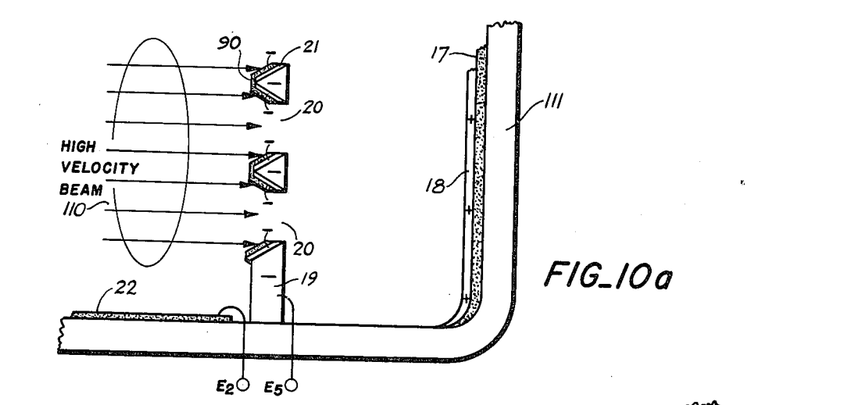
FIGURES 10a, b, and c, shows a series of fragmentary cross sections of the embodiment of FIGURE 8 for purposes of explanation of the operation thereof.
Figure 10B:
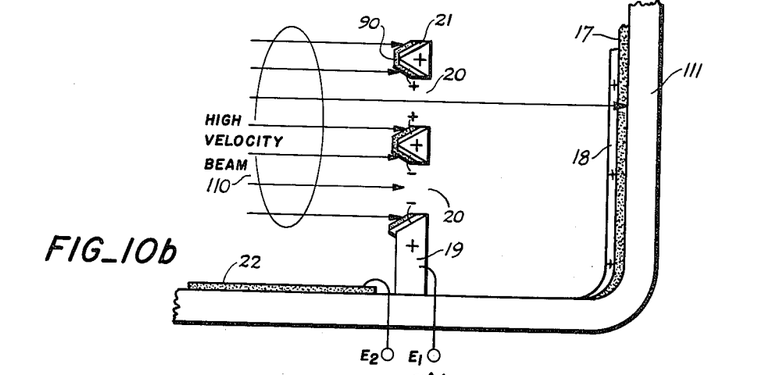
Figure 10C:
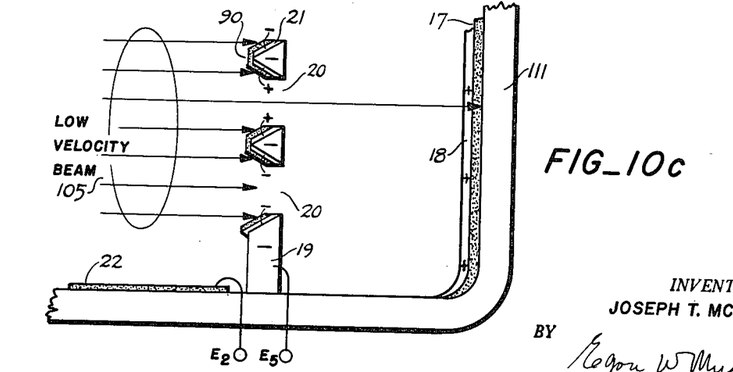

In operation, when a potential difference has been established between the surface of the photoconductive material 21 and the conductive backing 19 thereof, the effect of incident light, from the phosphor 90 overcoating the photoconductive material 21, will be to reduce this potential difference by increasing the conductivity of the photoconductive material. An initial potential difference may be established, making the front surface of the photoconductive material negative with respect to the collector anode 22, thereby repelling the electrons from the low velocity beam and collecting them by the collector anode 22. This negative charge may be placed on the photoconductive surface 21 by illuminating the phosphor 90 overcoating with a beam of electrons from the high velocity beam source 89 after having connected the conductive plate 19 to a negative potential $E_5$ with respect to the collector anode 22, as indicated in FIGURE 10a, all with reference to voltage source as shown in FIGURE 8. If, for example, the high velocity beam is then made to conform to a cross section in the shape of the letter A, and the conductive backing 19 is connected to a positive potential $E_1$, the photoconductive material 21, through excitation of the phosphor 90, will become conductive over a corresponding area which loses the negative charge $E_5$ in the shape of the letter A, as indicated diagrammatically in FIGURE 10b. After the photoconductor material 21 is again made negative as indicated in FIGURE 10c, the loss of the negative charge in the previously exposed areas permits electrons from the low velocity beam to pass through the perforations 20 in the conductive backing 19 thereby reconstructing the letter A on the viewing screen 17.

It can be seen from an examination of a set of average characteristic curves of a phosphor $P_4$, for example, that the candle power per square centimeter is a function of a voltage and current content of the electron beam used to excite the phosphor. These curves show that a 10,000 volt beam of 1 microamp per square centimeter will produce 0.019 candle power. But at 100 volts and 10 microamps beam current, the candle power is reduced to approximately 0.0001. Although the current in the low voltage beam is ten times that of the high voltage beam, the light output resulting from impingement of the low velocity beam is about 200 times less. Therefore, in this embodiment, the desired display memory is accomplished by utilizing the variations in electrical resistance of the photoconductive material 21 under the control of the phosphor 90 light source, rather than depending on equilibrium states of an electron bombarded floating surface for control of charged surface areas.

In the establishment of a negative $E_5$ potential on the surface of the photoconductive material 21 it may be further explained that the phosphor 90 may be scanned by a high velocity beam from the high velocity beam source 89 after placing the switches $S_1$, $S_2$ and $S_3$ shown in FIGURE 8, in the following positions: $S_1$—opened, $S_2$—closed, and $S_3$—closed. The positioning of the switches in this manner allows the entire phosphor 90 coating to be illuminated by scanning it with the high velocity beam to produce the subsequent illumination of the photoconductive material 21 making it conductive, and thereby, assume the $E_5$ negative potential applied to the conductive backing 19 with respect to the collector anode 22 potential.

The next step in the operation, just prior to the generation of a character shaped beam, is to close $S_1$, and then apply signal potentials. First the signal potentials are applied to the selection plates 55 for the selection of a character from the matrix 101, and second to the deflection plates 56 for the positioning of the desired character on the target 19. The next step is to open $S_1$ and $S_3$, momentarily, allowing the high velocity beam, in the shape of the desired character, to establish $E_1$ positive potential charges on the selected area of the photoconductive material 90. To complete the cycle, the next step is to open $S_2$, leaving $S_1$ and $S_3$ closed. This latter condition permits the low velocity beam from its gun source 88 to essentially flood the area immediately in front of the control grid 19, but passing electrons only through those openings 20 in the control grid 19 which are positively charged with $E_1$ potential in conformance with the shape of the desired character.

From the discussion of the phosphor $P_4$ characteristics above, it was pointed out that under low velocity beam conditions the candle power is approximately 0.0001. Although this figure indicates that the candle power, under the latter beam conditions, is $\frac{1}{200}$ of the candle power available under high velocity beam conditions, the neutralizing effect of electrons from the low velocity beam likely to impinge on the phosphor 90 will, in sufficient time, cause the positive potential $E_1$ charges, in the shape of message characters, to be neutralized by the negative potential $E_5$ applied to the conductive plate 19. Until the positive potential $E_1$ charges are neutralized, they will permit passage of a sustained electron flow from the low velocity electron source 88 through the openings 20 in the control grid in the pattern of the predetermined cross sections created by the high velocity beam. The low velocity beams, after having passed through the perforations 20, will be additionally accelerated by a high potential field established by the metallic backing 18 of the screen 17. The rather important feature of this type of utilization of the control grid 19 is that it can be made to assume, in effect, square wave response characteristics.

During the period that the low velocity gun source 88 is supplying current for the display of information, switch $S_3$ is closed, with the exception, however, of the short periods of time that it takes to create positive potential $E_1$ charges on the photoconductive surface 21. This provides a normally $E_5$ potential on the photoconductive surface which would prevent current flow through the openings 20 except in those areas of the photoconductor 21 that have received the $E_1$ positive potential charge. Since it is possible to control the potential of the low velocity beam with respect to the excitation requirements of the phosphor 90, the amount of light acting on the photoconductive material 21 may be controlled, and likewise the length of time it will be allowed to retain the positive charge potential. In operation, the $E_1$ potential will, in time, drop to an $E_3$ potential, as is shown on the curve in FIGURE 11, by a normal collection of electrons. This $E_3$ potential corresponds, therefore, to an equilibrium potential. The screen 17 excitation current $I_p$ of the tube, or that current admitted through the control grid 19, will have assumed a maximum value independent of the $E_1$ or $E_3$ potential, as shown on the curve, and remain at this level until the photoconductor 21 potential $E_g$ has dropped to a value of $E_4$ potential. From this $E_4$ potential point, the current $I_p$ will decrease to zero, with a corresponding decrease in selenium 21 potential, and just prior to assuming a potential equal to $E_5$. Independent of the decaying action of the various selenium 21 potential that have been placed on its photoconductive surface, however, interruptions may be made at any time for the purpose of writing new charge patterns on the photoconductive material 21.

The particular embodiments of the invention illustrated and described herein is illustrative only and the invention includes such other modifications and equivalents as may readily appear to those skilled in the art, within the scope of the appended claims.

I claim:

1. In an evacuated container the combination comprising beam generating means at one end of the container for projecting an electron beam toward the other end of the container, target means at the other end of the container responding to impingement of the electron beam thereon, light source means, control means having perforations therethrough and including photoconductive material capable of having an electrical condition positioned intermediate the generating means and the target for selectively modulating and controlling the electron beam in its passage therethrough, said control means responding to light projected onto and illuminating portions of said photoconductor material from without the container, a light projection system for projecting desired intelligence in form of light onto the control means, said projection system including a plurality of lens reflecting mirrors positioned within said container, said mirrors being so positioned as to receive and reflect intelligence from a source without the container onto the control means, said mirrors being adapted to cause simultaneous recordation of the intelligence onto a photo-sensitive film also without the container.

2. A storage tube comprising: means for producing a stream of electrons; a storage element positioned in the path of said stream of electrons, said storage element comprising a perforated sheet of conductive material and layer of photoconductive material disposed on a surface of said sheet of conductive material; means for producing a uniform electrical charge on said photoconductive layer; and means for dissipating said charge from selected areas of said layer, said means comprising means directing radiation onto said selected areas to selectively discharge said layer; the potentials of said charged and discharged areas being of magnitudes such that one potential blocks and the other allows the passage of said electron stream through adjacent perforations.

3. A storage tube comprising: a target; means for producing a stream of electrons; a storage element positioned between said electron stream producing means and said target, said storage element comprising a perforated conductive sheet having a layer of photoconductive material positioned on the unperforated portions of said sheet; a first source of potential; means for producing a uniform electrical charge on said photoconductive layer, said means comprising a connection between said conductive sheet and said potential source and means for uniformly irradiating said photoconductive material to thereby cause it to become uniformly conductive, and bring all areas of said layer to the potential level of said potential source; a second source of potential; means for connecting said sheet to said second source of potential; and means including said uniform radiating means for directing radiation onto selected areas of said layer, for causing said selected areas to become conductive and permit said selected areas to assume the potential level of said second potential source whereby said storage element has a charge pattern established thereon; said potentials of said first and second sources being of a magnitude sufficient such that one potential allows electrons to traverse the perforations adjacent thereto while the other potential blocks the passage of said electron stream.

4. The combination of claim 3 wherein said means for selective radiation comprises an external source.

5. The combination of claim 3 wherein said means for selective radiation comprises a cathode ray tube.

6. The combination of claim 3 wherein said means for selective radiation comprises a phosphor and means causing an electron beam to impinge thereon whereby selected areas of said phosphor produce radiation.

References Cited in the file of this patent

UNITED STATES PATENTS

| | | |
|---|---|---|
| 2,551,582 | Carlson | May 8, 1951 |
| 2,555,091 | Lubszynski | May 29, 1951 |
| 2,667,596 | Szegho | Jan. 26, 1954 |
| 2,728,872 | Smith | Dec. 27, 1955 |
| 2,730,708 | McNaney | Jan. 10, 1956 |
| 2,765,422 | Henderson | Oct. 2, 1956 |
| 2,806,174 | Pensak | Sept. 10, 1957 |
| 2,824,247 | Szegho | Feb. 18, 1958 |
| 2,824,248 | Szegho et al. | Feb. 18, 1958 |
| 2,825,834 | Szegho et al. | Mar. 4, 1958 |